United States Patent [19]

Hwang et al.

[11] Patent Number: 5,854,157
[45] Date of Patent: Dec. 29, 1998

[54] CERAMIC COMPOSITE

[75] Inventors: Hae Jin Hwang; Masaki Yasuoka; Mutsuo Sando; Toru Nagai, all of Aichi; Koichi Niihara, Osaka, all of Japan

[73] Assignees: Agency of Industrial Science and Technology; Fine Ceramics Research Association, both of Tokyo, Japan

[21] Appl. No.: 848,250

[22] Filed: Apr. 29, 1997

[30] Foreign Application Priority Data

Apr. 30, 1996 [JP] Japan .................................. 8-134342

[51] Int. Cl.$^6$ .......................... C04B 35/10; C04B 35/48; C04B 35/04
[52] U.S. Cl. .......................... 501/104; 501/108; 501/110; 501/123; 501/118; 501/119; 501/120; 501/125; 501/127; 501/134; 428/689; 428/697; 428/404
[58] Field of Search ..................... 501/104, 120, 501/123, 127, 125, 134, 108, 110, 118, 119; 428/689, 697, 404

[56] References Cited

U.S. PATENT DOCUMENTS

| | | | |
|---|---|---|---|
| 4,881,951 | 11/1989 | Wood et al. | 51/309 |
| 5,460,640 | 10/1995 | Buljan | 75/233 |
| 5,489,318 | 2/1996 | Erickson et al. | 501/127 |

*Primary Examiner*—Michael Marcheschi
*Attorney, Agent, or Firm*—Oblon, Spivak, McClelland, Maier & Neustadt, P.C.

[57] ABSTRACT

An object of the present invention is to provide a novel ceramic composite that has not only excellent dynamic characteristics, but also good electromagnetic characteristics, typified by dielectric characteristics, and the present invention relates to a ceramic composite, characterized in that an oxide having a perovskite structure which includes as raw materials lead and/or an alkaline earth metal is dispersed in a ceramic matrix, and in the above-mentioned ceramic composite, preferably the ceramic matrix is MgO, $MgAl_2O_4$, or $ZrO_2$, and also, preferably in the above-mentioned ceramic composite, the perovskite structure oxide particles are covered with MgO, $MgAl_2O_4$, or $ZrO_2$, and the ceramic matrix is $Al_2O_3$.

8 Claims, No Drawings

CERAMIC COMPOSITE

DESCRIPTION OF THE INVENTION

The present invention relates to a ceramic composite in which an oxide having a perovskite structure with excellent dielectric characteristics is dispersed in a structural material ceramic with excellent dynamic characteristics, and more particularly relates to a novel ceramic composite produced by using MgO, $MgAl_2O_4$, $ZrO_2$, or the like as the ceramic matrix to suppress the reaction and decomposition of a perovskite oxide and to compound a structural ceramic with a perovskite oxide.

The present invention makes it possible to manufacture a novel ceramic composite that has not only excellent dynamic characteristics, but also good electromagnetic characteristics, typified by dielectric characteristics.

BACKGROUND OF THE INVENTION $Al_2O_3$-based materials, $Si_3N_4$-based materials, and the like have been developed up to now as structural material ceramics. The so-called dynamic characteristics, such as strength, toughness, and wear resistance, of these materials are excellent, but these materials are lacking in their pertinent electromagnetic characteristics, such as dielectric and voltage characteristics. Therefore, the use of these ceramics in structural material applications is limited at the present time to taking advantage of these dielectric characteristics.

On the other hand, if dielectric characteristics and other such electromagnetic characteristics could be imparted to structural material ceramics that up to now have only been used for their dynamic characteristics, then it should be possible to use the product as a completely new ceramic that has excellent dynamic characteristics and combines these with good dielectric characteristics and other such electromagnetic characteristics. The known group of materials with excellent dielectric characteristics includes oxides having a perovskite structure, such as materials based on $BaTiO_3$, $Pb(Zr, Ti)O_3$, $Pb(Mg_{1/3}Nb_{2/3})O_3$, or $(Ba, Sr)(Mg_{1/3}Ta_{2/3})O_3$.

The inventors reached the conclusion that if a composite could be produced by dispersing one of these perovskite oxides in a structural material ceramic with excellent dynamic characteristics, then it might be possible to obtain a material that combines dynamic characteristics with electromagnetic characteristics. Research was commenced on the basis of this idea, but technical difficulties were soon encountered. Specifically, while the sintering temperature of the structural material ceramics that were being used for the matrix of the composite varied greatly with the material, it was over 1400° C. in almost every case. When an attempt was made to compound a structural material ceramic with a perovskite oxide by sintering at this temperature, the problem arose that the barium, strontium, or other alkaline earth elements, lanthanum or other rare earth elements, lead, or the like in the perovskite oxide reacted with the matrix, and the perovskite decomposed.

The inventors determined to conduct further research in the hope of solving the above problems. Naturally, there had been almost no work done with perovskite oxides and other ceramics, and it was difficult to predict this reaction. Therefore, a great deal of trial and error was entailed in the process of searching for a material that would not react when a perovskite oxide was sintered.

As a result, the inventors discovered first that MgO, $MgAl_2O_4$, and $ZrO_2$ are ceramics that do not cause the reaction and decomposition of a perovskite oxide at a temperature of 1400° C. or above. They further discovered that if a perovskite oxide is covered with MgO, $MgAl_2O_4$, or $ZrO_2$, then when this product is compounded with $Al_2O_3$ by sintering, the MgO, $MgAl_2O_4$, or $ZrO_2$ covering functions as a reaction control layer and suppresses the decomposition reaction of the perovskite oxide, and this discovery led to the perfection of the present invention.

SUMMARY OF THE INVENTION

An object of the present invention is to provide a novel ceramic composite that has not only excellent dynamic characteristics, but also good electromagnetic characteristics, typified by dielectric characteristics.

The present invention relates to a ceramic composite, characterized in that an oxide having a perovskite structure which includes as raw materials lead and/or an alkaline earth metal is dispersed in a ceramic matrix.

In the above-mentioned ceramic composite, the ceramic matrix is MgO, $MgAl_2O_4$, or $ZrO_2$. Also, in the above-mentioned ceramic composite, the perovskite structure oxide particles are covered with MgO, $MgAl_2O_4$, or $ZrO_2$, and the ceramic matrix is $Al_2O_3$.

DETAILED DESCRIPTION OF THE INVENTION

An object of the present invention is to provide a novel ceramic composite that has not only excellent dynamic characteristics, but also good electromagnetic characteristics, typified by dielectric characteristics.

Another object of the present invention is to provide a ceramic composite in which an oxide having a perovskite structure is dispersed in a structural material ceramic.

Specifically, the present invention provides the following means for solving the problems.

(1) A ceramic composite, characterized in that an oxide having a perovskite structure which includes as raw materials lead and/or an alkaline earth metal is dispersed in a ceramic matrix.

(2) The ceramic composite in (1), characterized in that the ceramic matrix is MgO, $MgAl_2O_4$, or $ZrO_2$.

(3) The ceramic composite in (1), characterized in that oxide particles having a perovskite structure which includes as raw materials lead and/or an alkaline earth metal are covered with MgO, $MgAl_2O_4$, or $ZrO_2$ and are dispersed in a ceramic matrix.

(4) The ceramic composite in (3), characterized in that the ceramic matrix is $Al_2O_3$.

When $ZrO_2$ is used in the implementation of the above (2) or (4), it has been noted that zirconium dissolves as a solid solution into the B sites of the perovskite in the case of some perovskite oxides. However, the perovskite structure does not itself break down in the sintering with $ZrO_2$, and perovskite can be considered a compoundable ceramic matrix. Favorable embodiments of the present invention are a method for manufacturing a ceramic composite, characterized in that a perovskite oxide is mixed with a raw material powder of MgO, $MgAl_2O_4$, or $ZrO_2$, and this mixture is formed and sintered; and a method for manufacturing a ceramic composite, characterized in that perovskite oxide particles are covered with MgO, $MgAl_2O_4$, or $ZrO_2$, and this product is mixed with $Al_2O_3$, formed, and sintered.

The group of oxides with a perovskite structure which include as raw materials lead and/or an alkaline earth metal that can be used in the present invention includes $BaTiO_3$, $SrTiO_3$, $PbTiO_3$, $PbZrO_3$, $Pb(Zr, Ti)O_3$, $(PbLa)(Zr, Ti)O_3$, $Pb(Mg_{1/3}Nb_{2/3})O_3$, $Pb(Fe_{1/2}Nb_{1/2})O_3$, $Pb(Zn_{1/3}Nb_{2/3})O_3$, $Pb(Fe_{2/3}W_{1/3})O_3$, $Pb(Mg_{1/2}W_{1/2})O_3$, $(Ba\ Sr)(Mg_{1/3}Ta_{2/3})O_3$, $(Ba, Sr)(Zn_{1/3}Ta_{2/3})O_3$, $(Ba, Sr)(Mg_{1/2}W_{1/2})O_3$, and the like. These oxides should be given a perovskite structure in advance by using an oxide, a carbonate, or the like as the starting raw material, and mixing, calcining it to synthese them. A perovskite oxide synthesized by an alkoxide method, co-precipitation method, or the like can also be used in the present invention.

When a composite whose matrix is MgO, $MgAl_2O_4$, or $ZrO_2$ is synthesized, the above-mentioned perovskite oxide powder can be mixed with an MgO, $MgAl_2O_4$, or $ZrO_2$ raw material powder, formed, and sintered to produce a composite.

There are no particular restrictions on the method for mixing the raw materials, but when a powder is used as a raw material, any ordinary method that is employed in the mixing of ceramics, such as a ball mill or a vibrating mill, can be utilized.

Uniaxial press forming or the like may be used for the forming, but a more uniform formed article can be obtained by using cold isostatic press (CIP) forming.

The sintering may be performed by a normal pressure method, or a pressure sintering method, such as hot pressing, may be used so as to obtain a densified sinter in a shorter time. The sintering temperature will vary with the raw material, but from the standpoint of obtaining a densified composite, a temperature of at least 1200° C. is preferable, regardless of whether the matrix is MgO, $MgAl_2O_4$, or $ZrO_2$.

In order to synthesize a composite in which $Al_2O_3$ is the matrix, the perovskite oxide must first be coated with MgO, $MgAl_2O_4$, or $ZrO_2$ by an alkoxide process. This coating can be accomplished, for example, by dispersing perovskite oxide particles in hexane or another such hydrophobic solvent, adding magnesium propoxide, zirconium propoxide, or another alkoxide of the coating raw material, and performing hydrolysis to deposit [MgO, $MgAl_2O_4$, or $ZrO_2$] on the surface. This powder can be mixed with $Al_2O_3$, formed, and sintered to produce a composite. If the perovskite oxide is coated with MgO and this product is sintered with $Al_2O_3$, the coating layer will react with the $Al_2O_3$ of the matrix in the course of the sintering and form an $MgAl_2O_4$ layer, which will function as a reaction control layer. The favorable sintering temperature range in the present invention is 1200° C. and above. A sufficiently dense sintered body will be difficult to obtain if the sintering is conducted below this temperature.

EXAMPLES

The present invention will now be described in specific terms on the basis of examples, but the present invention is in no way limited by these examples.

Example 1

Using high-purity $BaCO_3$, $SrCO_3$, MgO, and $Ta_2O_5$ powders as the raw materials, these powders were weighed out in the specific amounts for synthesizing a perovskite oxide $(Ba_{0.4}Sr_{0.6})(Mg_{1/3}Ta_{2/3})O_3$, and were then wet mixed for 16 hours in methanol inside a ball mill. This mixture was dried in a rotary evaporator, then heat treated for 4 hours at 1300° C. in the air to obtain a calcined powder of $(Ba_{0.4}Sr_{0.6})(Mg_{1/3}Ta_{2/3})O_3$. This calcined powder of $(Ba_{0.4}Sr_{0.6})(Mg_{1/3}Ta_{2/3})O_3$ was then pulverized in methanol inside a vibrating mill and dried.

MgO, $MgAl_2O_4$, $ZrO_2$, $Al_2O_3$, and $Si_3N_4$ were each weighed out and mixed in a ball mill with the above pulverized powder such that the pulverized powder accounted for 20 vol %. Of the mixed powders thus obtained, the one with MgO, the one with $MgAl_2O_4$, the one with $ZrO_2$, and the one with $Al_2O_3$ were sintered with a hot press in a nitrogen atmosphere while pressurization of 400 $kgf/cm^2$ was performed for 1 hour at 1400° C. The mixed powder with $Si_3N_4$ was sintered with a hot press in a nitrogen atmosphere while pressurization of 400 $kgf/cm^2$ was performed for 1 hour at 1650° C.

Identification was performed for the produced sinter phases by X-ray diffractometer, and as a result, nothing was detected for the composite of $(Ba_{0.4}Sr0.6)(Mg_{1/3}Ta_{2/3})O_3$ with MgO or $MgAl_2O_4$ except the $(Ba_{0.4}Sr_{0.6})(Mg_{1/3}Ta_{2/3})O_3$ phase and the MgO or $MgAl_2O_4$ phase. With the composite with $ZrO_2$, the regular arrangement of the magnesium and tantalum of the $(Ba_{0.4}Sr_{0.6})(Mg_{1/3}Ta_{2/3})O_3$ did not proceed, which is surmised to be attributable to a zirconium solid solution in the B sites of the perovskite, but X-ray peaks corresponding to the basic structure of perovskite were detected, indicating that the perovskite structure itself had been preserved. In contrast, with the composites with $Al_2O_3$ or $Si_3N_4$, the perovskite reacted with the matrix in the course of the sintering, and no $(Ba_{0.4}Sr_{0.6})(Mg_{1/3}Ta_{2/3})O_3$ phase remained in the sinter.

The composites of $(Ba_{0.4}Sr_{0.6})(Mg_{1/3}Ta_{2/3})O_3$ with MgO, $MgAl_2O_4$, or $ZrO_2$ were all obtained at 98% of the theoretical density or higher.

Example 2

The pulverized powder of $(Ba_{0.4}Sr_{0.6})(Mg_{1/3}Ta_{2/3})O_3$ obtained in Example 1 was dispersed in a mixture of hexane, a small amount of isopropanol, and a small amount of water. Magnesium propoxide or zirconium propoxide that had been dissolved in a solution of hexane and a small amount of isopropanol was added a little at a time to this suspension, and the system was stirred for approximately 1 day. This product was dried and the powder recovered, after which it was heat treated in the air for 1 hour at 600° C.

$\alpha$-$Al_2O_3$ was weighed out and mixed in a ball mill with the powder thus obtained such that the latter accounted for 20 vol %. The mixed powder thus obtained was sintered with a hot press in a nitrogen atmosphere while pressurization of 400 $kgf/cm^2$ was performed for 1 hour at 1400° C.

Identification was performed for the produced sinter phases by X-ray diffractometer, and as a result, nothing was detected except the $(Ba_{0.4}Sr_{0.6})(Mg_{1/3}Ta_{2/3})O_3$ phase and the $MgAl_2O_4$ phase, both when propoxy magnesium and when propoxy zirconium were used. For all of the composites, the relative density of the obtained composite was 98% of the theoretical density or higher.

As detailed above, the present invention relates to a ceramic composite, characterized in that an oxide having a perovskite structure which includes as raw materials lead and/or an alkaline earth metal is dispersed in a ceramic matrix. The present invention makes it possible to produce by a sintering process a composite in which an oxide having a perovskite structure is dispersed in a structural ceramic. As a result, it is possible for a structural material ceramic also to have good dielectric characteristics and other such electromagnetic characteristics.

We claim:

1. A ceramic composite comprising a ceramic matrix and an oxide dispersed in the ceramic matrix, wherein the oxide has a perovskite structure, and the oxide comprises at least one element selected from the group consisting of lead and an alkaline earth metal.

2. The ceramic composite as defined in claim 1, wherein the ceramic matrix consists of at least one compound selected from the group consisting of MgO, $MgAl_2O_4$, and $ZrO_2$.

3. The ceramic composite as defined in claim 1, further comprising at least one compound selected from the group consisting of MgO, $MgAl_2O_4$, and $ZrO_2$ coated on the oxide.

4. The ceramic composite as defined in claim 3, wherein the ceramic matrix consists of $Al_2O_3$.

5. A ceramic composite as defined in claim 1 wherein the oxide further comprises an element selected from the group consisting of Ti, Fe, Zn, Zr, Nb, Ta and W.

6. The ceramic composite as defined in claim 5, wherein the ceramic matrix consists of at least one compound selected from the group consisting of MgO, $MgAl_2O_4$, and $ZrO_2$.

7. A ceramic composite comprising a ceramic as defined in claim 3 wherein the oxide further comprises an element selected from the group consisting of Ti, Fe, Zn, Zr, Nb, Ta, and W.

8. The ceramic composite as defined in claim 7, wherein the ceramic matrix consists of $Al_2O_3$.

* * * * *